United States Patent [19]

Iwasa

[11] Patent Number: 4,603,899

[45] Date of Patent: Aug. 5, 1986

[54] WEATHER STRIP

[75] Inventor: Tadanobu Iwasa, Aichi, Japan

[73] Assignee: Toyoda Gosei Co., Ltd., Nishikasugai, Japan

[21] Appl. No.: 760,248

[22] Filed: Jul. 29, 1985

[30] Foreign Application Priority Data

Jul. 31, 1984 [JP] Japan ................... 59-162324

[51] Int. Cl.⁴ ............................................. B60R 13/06
[52] U.S. Cl. ...................................... 296/154; 49/476;
49/490; 428/122; 428/358; 428/913; 428/188
[58] Field of Search ................ 428/31, 122, 358, 913,
428/517, 519, 188; 49/476, 490, 475; 52/716;
296/154

[56] References Cited

U.S. PATENT DOCUMENTS 4,445,721  5/1984  Yaotani et al. .................. 296/154
4,513,044  4/1985  Shigeki et al. .................. 428/122

Primary Examiner—Alexander S. Thomas
Attorney, Agent, or Firm—Cushman, Darby & Cushman

[57] ABSTRACT

A weather strip comprises a main body having a water passage for draining rainwater, etc. and a water flow promoting member or members forming an integral part of the main body, provided in the water passage and containing a hydrophilic material. The main body is formed from EPDM rubber. The hydrophilic material is a hydrophilic polymer having good compatibility with the EPDM rubber. The water flow promoting member is bonded by vulcanization to the main body.

11 Claims, 5 Drawing Figures

WEATHER STRIP

BACKGROUND OF THE INVENTION

1. Field of the Invention

This invention relates to a weather strip attached to the edge of a door or like opening in an automobile, house, etc. for preventing the leakage of rainwater, dust, etc. thereinto. More particularly, it relates to a weather strip having an improved water passage.

2. Description of the Prior Art

A weather strip is usually formed from ethylene propylene rubber known as ethylene-propylene-diene terpolymer (EPDM). The EPDM has a high degree of resistance to weather, heat and water and a weather strip formed from it, therefore, has a long life. The EPDM rubber for a weather strip contains large amounts of carbon black and process oil which reduce its cost and improve its workability and fitting adaptability. The high water resistance of the EPDM polymer and the process oil added in a large quantity thereto greatly improves the water resistance of the weather strip and make it completely proof against rainwater or washing water.

The weather strip is usually so specially shaped as to shut off rainwater, etc. FIG. 5 shows by way of example a weather strip 51 for the trunk of an automobile. It has a plurality of mounting lips 54 held against the body 52 of the automobile and a draining lip 55 held against the outer surface of the body 52. The lips are provided for enabling the weather strip 51 to form an effective water seal between the lid of the trunk and the body 52. A gap exists between the lower surface of the weather strip 51 and the outer surface of the body 52 and defines a water passage 56 for draining rainwater, etc. to prevent it from leaking into the automobile.

If there is any dimensional error on the part of the body 52, however, it is difficult to obtain a complete seal between the weather strip 51 and the body 52, since it is impossible to close any possible clearance therebetween completely. As the weather strip 51, which is formed from EPDM, has a high degree of water proofness, the rainwater reaching the water passage 56 blocks it because of its surface tension and the water overflowing it leaks into the automobile through the clearance between the weather strip 51 and the body 52.

Therefore, it is necessary to fill any such clearance with a castable sealant. This is, however, a troublesome job.

SUMMARY OF THE INVENTION

It is an object of this invention to provide a weather strip having a water passage which can effectively drain rainwater, etc. to prevent any leakage thereof into an automobile, etc.

This object is attained by a weather strip comprising a main body provided with a water passage which includes a water flow promoting portion having a hydrophilic material.

Other objects of this invention will become apparent from the following description and the accompanying drawings. A lot of features and advantages of this invention which will not herein be mentioned specifically will be obvious to anybody of ordinary skill in the art.

DETAILED DESCRIPTION OF THE PREFERRED EMBODIMENTS

Figure 1:
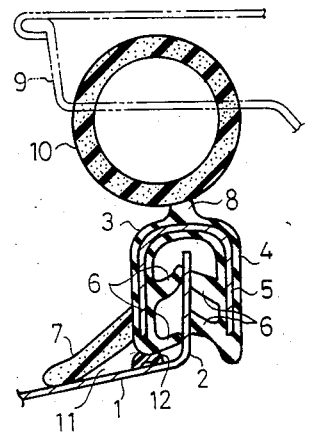
FIG. 1 is a cross sectional view of a weather strip embodying this invention and adapted for use on the trunk of an automobile.

Referring first to FIG. 1, there is shown a weather strip embodying this invention and adapted for use on the trunk of an automobile. The body 1 of the automobile has an opening defining the trunk and has a flange 2 at its inner edge. The weather strip comprises a main body 3 formed from EPDM rubber and extending along the flange 2. It includes a trim portion 4 having an inverted U-shaped cross section. A metal core 5 is embedded in the trim portion 4 and comprises a plurality of split parts so that the main body 3 may be flexible. The trim portion 4 has four mounting lips 6. Two of the lips 6 project from one of the opposite inner surfaces of the trim portion 4 and the other two lips 6 project from the other inner surface thereof, so that the flange 2 is held between the free ends of the lips 6. A draining lip 7 projects from the outer surface of the trim portion 4 and has a free end held against the outer surface of the body 1. The lip 7 is formed from EPDM sponge rubber. A supporting ridge 8 projects from the top center of the trim portion 4 and supports thereon a cylindrical sealing tube 10 adapted to be brought into intimate contact with the lid 9 of the trunk. The sealing tube 10 is formed from EPDM sponge rubber and bonded by vulcanization to the supporting ridge 8.

A gap exists between the upper surface of the body 1 and the lower surface of the draining lip 7 and defines a water passage 11. The rainwater or washing water leaking through any possible clearance between the body 1 and the lip 7 is drained through the water passage 11 and a drain hole not shown. The main body 3 is provided at its bottom with a water flow promoting portion 12 formed from a hydrophilic material, extending along the water passage 11 and having a lower end maintained in intimate contact with the upper surface of the body 1.

The hydrophilic material from which the water flow promoting portion 12 is prepared by heating in the presence of an amine catalyst a low molecular polyolefin polyol having good compatibility with the EPDM rubber from which the main body 3 of the weather strip is formed, and adding an appropriate amount of ethylene oxide thereto under stirring. It is extrusion molded with the main body 3 and bonded thereto by vulcanization.

The hydrophilic portion 12 controls the surface tension of rainwater, etc. leaking into the water passage 11 and promotes the flow of water through the water passage 11. It is, therefore, possible to ensure that no water entering the water passage 11 collect therein and overflow the flange 2 into the trunk.

The water flow promoting portion 12 may alternatively be formed from a hydrophilic material prepared by adding polyethylene glycol, a surface active agent, an emulsifier, or any other hydrophilic agent to EPDM rubber. It may also be formed from a hydrophilic material containing a water absorbing polymer, such as a saponified vinyl acetate-methyl acrylate copolymer (e.g. Sumicagel of Sumitomo Chemical Co., Ltd.), or from a hydrophilic material prepared by adding any such water absorbing polymer to the low molecular polyolefin polyol. In case any hydrophilic agent is used, it may be necessary to add it in a relatively large quantity, since it lowers its hydrophilic effect as a result of a gradual loss with the lapse of time.

The water flow promoting portion 12 may be bonded to the main body 3 by an adhesive instead of being extruded with the main body 3 and bonded thereto by vulcanization.

The water flow promoting portion 12 may alternatively be formed from a paint which may be prepared by dissolving a hydrophilic material consisting mainly of a low molecular polyolefin polyol and ethylene oxide in a solvent, such as toluene, and which may be applied to the lower surfaces of the trim portion 4 and the draining lip 7 by spraying or brushing and cured. The hydrophilic material will be described later in further detail.

A number of other embodiments of this invention will now be described with reference to FIGS. 2 to 4.

Figure 2:
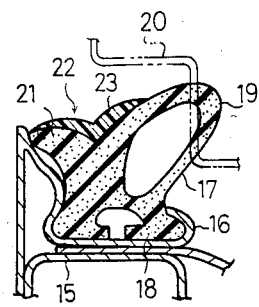
FIG. 2 is a cross sectional view of another weather strip embodying this invention and used for an automobile door.

(1) Referring to FIG. 2, there is shown a weather strip used for an automobile door. The door 15 has an edge to which a channel member 16 is secured. The weather strip comprises a main body 17 formed from EPDM sponge rubber and having a mounting portion 18 fitted in the channel member 16. A substantially cylindrical sealing tube 19 projects from the main body 17 toward the body 20 of the automobile and has a free edge which can be brought into intimate contact with the body 20. A sealing lip 21 also projects from the main body 17 and has a free edge held in intimate contact with the door 15.

The sealing tube 19 and the sealing lip 21 define a water passage 22 therebetween. A water flow promoting portion 23 formed from a hydrophilic material is provided in the water passage 22 and bonded to the main body 17 by vulcanization or by an adhesive, or otherwise. The water flow promoting portion 23 is equal to its counterpart in the weather strip of FIG. 1 in the function of promoting the flow of rainwater, etc. along the water passage 22 and thereby preventing its leakage into the automobile.

Figure 3:
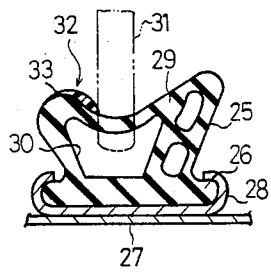
FIG. 3 is a cross sectional view of still another weather strip embodying this invention and used for the roof of an automobile.

(2) FIG. 3 shows a weather strip used for the roof of an automobile. It comprises a main body 25 formed from EPDM rubber and having a mounting portion 26 fitted in a channel member 28 on the body 27 of the automobile. It includes a sealing portion 29 which can be brought into intimate contact with a window pane 31 when it is closed. The main body 25 has a hollow interior 30. When the window pane 31 is closed, the sealing portion 29 remotes from the interior of the automobile and the window pane 31 defines a water passage 32 therebetween. A water flow promoting portion 33 formed from a hydrophilic material is provided in the water passage 32 and forms an integral part of the sealing portion 29. It will be easily understood that the water flow promoting portion 33 is as effective as its counterparts in the weather strips as hereinbefore described.

Figure 4:
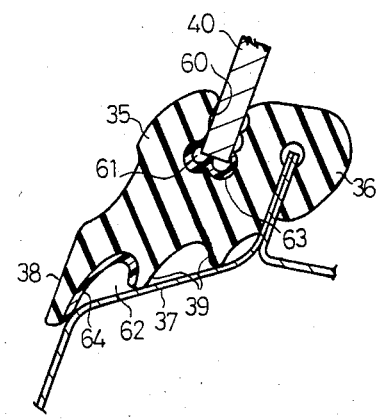
FIG. 4 is a cross sectional view of a further weather strip embodying this invention and used for a built-in window pane on an automobile.
Figure 5:
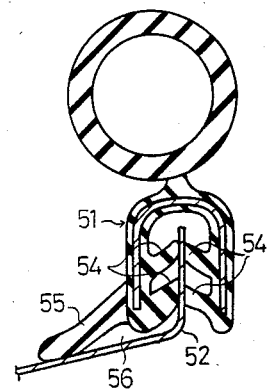
FIG. 5 is a cross sectional view of a conventional weather strip.

(3) FIG. 4 shows a weather strip for a built-in window pane on an automobile. It comprises a main body 35 having a mounting lip 36 which secures it to the body 37 of the automobile. The main body 35 also has a pressing lip 38 held against the outer surface of the automobile body 37, a pair of sealing lips 39 also held against the surface of the body 37 and a groove 60 in which a window pane 40 is fitted. The body 37 and the lip 38 define a water passage 62 therebetween. The window pane 40 and the body 35 defining the groove 60 define another water passage 61 therebetween. A water flow promoting portion 63 is provided in the water passage 61 and a water flow promoting portion 64 is likewise provided in the water passage 62. The two water flow promoting portions 63 and 64 are each formed from a hydrophilic material and form an integral part of the main body 35. They promote the flow of rainwater, etc. along the water passages 61 and 62, respectively, and thereby prevent it from collecting therein.

Although the invention has been described with reference to the weather strips for an automobile, it is also applicable to glass runs formed from SBR, PVC, etc. and used for the glass sliding surfaces of a door or window in an automobile, etc., or a door, glass pane, etc. in a house.

The hydrophilic material from which the water flow promoting portions 12, 23, 33, 63 and 64 are formed as hereinabove described will now be described in further detail with reference to TABLES 1 to 4.

Referring to TABLE 1, Examples 1 to 10 are illustrative of a variety of hydrophilic materials prepared by adding to EPDM rubber different amounts of polyethylene glycol or surface active agents for making it hydrophilic. Comparative Example 1 shows a material which was not made hydrophilic. All of the materials according to Examples 1 to 10 and Comparative Example 1 were prepared by kneading the components, except the vulcanization promotors, for five minutes in a BR Banbury mixer, cooling the mixture, adding the vulcanization promotors by an 8 in. open roll, extruding the mixture by a 30 mm dia. roll having a length to diameter ratio of 15 into a rubber sheet having a thickness of 2 mm and a width of 30 mm, and heating it with hot air having a temperature of 200° C. for five minutes for vulcanizing it.

Example 11 in TABLE 2 shows a material consisting mainly of a hydrophilic polymer, and Comparative Example 2 shows a material which was not made hydrophilic. Both of the materials were prepared by mixing the components, except the isocyanate, in a one-liter kneader under stirring, adding the isocyanate, and curing the mixture at 180° C. for 20 minutes in a mold having an inside thickness of 2 mm, an inside width of 50 mm and an inside length of 100 mm.

TABLES 3 and 5 show the hydrophilicity of each of the materials according to Examples 1 to 11 and Comparative Examples 1 and 2 under normal conditions in terms of its angle of contact with water. Each of the materials according to EXAMPLES 1 to 11 and Comparative Examples 1 and 2 was dipped in water having a temperature of 23° C. for 70 hours and dried at a temperature of 70° C. for 24 hours, and its angle of contact with water was measured. The results are shown in TABLES 4 and 6.

As is obvious from TABLES 3 and 4, all of the materials according to Examples 1 to 4 containing polyethylene glycol and the materials according to Examples 5 to 10 containing a surface active agent showed a lower angle of contact with water than that of the material according to Comparative Example 1, whether under normal conditions or after they had been dipped in water. These results confirm that if the water flow promoting portion of a weather strip is formed from a hydrophilic material containing any such hydrophilic agent, it effectively promotes the flow of water along the water passage. It is, however, to be noted that polyethylene glycol or a surface active agent gradually loses its hydrophilic effect with the lapse of time as it is gradually lost upon exposure to water. As is obvious from TABLES 5 and 6, the material according to Example 11 comprising a hydrophilic polymer showed a by far smaller angle of contact with water than the material according to Comparative Example 2, and even a smaller angle of contact with water than any of the materials according to Examples 1 to 10 containing a hydrophilic agent. These results confirm the still higher hydrophilic effect of the water flow promoting portion of a weather strip which is formed from a hydrophilic polymer. Moreover, the use of a hydrophilic polymer has the advantage that its angle of contact with water is only slightly smaller after exposure to water than before.

While the invention has been described with reference to the preferred embodiments and examples thereof, it is to be understood that modifications or variations may be easily made by anybody of ordinary skill in the art without departing from the scope of this invention which is defined by the appended claims.

TABLE 1

| | Comparative Example | Example | | | | | | | | | |
|---|---|---|---|---|---|---|---|---|---|---|---|
| | 1 | 1 | 2 | 3 | 4 | 5 | 6 | 7 | 8 | 9 | 10 |
| EPDM (JSREP57C) | 100 | 100 | 100 | 100 | 100 | 100 | 100 | 100 | 100 | 100 | 100 |
| FEF carbon | 130 | 130 | 130 | 130 | 130 | 130 | 130 | 130 | 130 | 130 | 130 |
| Paraffinic process oil | 100 | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 | 1 |
| Dehydrating agent | 5 | 5 | 5 | 5 | 5 | 5 | 5 | 5 | 5 | 5 | 5 |
| Polyethylene glycol (PEG-400S) | — | 2 | 4 | 8 | 16 | — | — | — | — | — | — |
| Surface active agent *1(NOIGEN ET-167) | — | — | — | — | — | 4 | 8 | 16 | — | — | — |
| Surface active agent *2(Emulgen PP-150) | — | — | — | — | — | — | — | — | 4 | 8 | 16 |
| Vulcanization promotor MBT | 1 | 1 | 1 | 1 | 1 | 1 | 1 | 1 | 1 | 1 | 1 |
| Vulcanization promotor TMTD | 1 | 1 | 1 | 1 | 1 | 1 | 1 | 1 | 1 | 1 | 1 |
| Vulcanization promotor ZnBDC | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 |

*1Higher alcoholic nonionic surface active agent of Daiichi Kogyo Seiyaku Co.;
*2Nonionic surface active agent of Kao Corporation.

TABLE 2

Composition of material comprising a hydrophilic polymer

| | Comparative Example 2 | Example 11 |
|---|---|---|
| Low molecular polyolefin polyol*1 | 100 | — |
| Low molecular polyolefin polyol containing ethylene oxide*2 | — | 100 |
| FEF carbon | 10 | 10 |
| Paraffinic process oil | 50 | 50 |
| Hexamethylene diisocyanate | 14 | 8 |
| Durante 24A-100 | | |

*1polytale HA of Mitsubishi Chemical Industries Limited;
*2MKU-111 having a hydroxyl number of 28.2 (mg KOH/g) of Mitsubishi Chemical Industries Limited.

TABLE 3

Angle of contact with water of materials containing a hydrophilic agent under normal conditions

| | Comparative Example 1 | Example | | | | | | | | | |
|---|---|---|---|---|---|---|---|---|---|---|---|
| | | 1 | 2 | 3 | 4 | 5 | 6 | 7 | 8 | 9 | 10 |
| Angle of contact with water (°) | 92 | 75 | 70 | 68 | 62 | 65 | 60 | 57 | 59 | 50 | 42 |

TABLE 4

Angle of contact with water of materials containing a hydrophilic agent and dipped in water at 23° C. for 70 hours and dried at 70° C. for 24 hours

| | Comparative Example 1 | Example | | | | | | | | | |
|---|---|---|---|---|---|---|---|---|---|---|---|
| | | 1 | 2 | 3 | 4 | 5 | 6 | 7 | 8 | 9 | 10 |
| Angle of contact with water (°) | 90 | 78 | 74 | 70 | 64 | 67 | 64 | 59 | 63 | 55 | 49 |

TABLE 5

Angle of contact with water of materials consisting mainly of a hydrophilic polymer under normal conditions

| | Comparative Example 2 | Example 11 |
|---|---|---|
| Angle of contact with water (°) | 95 | 40 |

TABLE 6

Angle of contact with water of materials containing a hydrophilic polymer and dipped in water at 23° C. for 70 hours and dried at 70° C. for 24 hours

|  | Comparative Example 2 | Example 11 |
|---|---|---|
| Angle of contact with water (°) | 96 | 39 |

What is claimed is:

1. A weather strip comprising:
   (a) a main body;
   (b) said main body having a water passage; and
   (c) a water flow promoting member provided in said water passage, forming an integral part of said main body and containing a hydrophilic material.

2. A weather strip as set forth in claim 1, wherein said main body is formed from EPDM rubber, said hydrophilic material is a hydrophilic polymer having good compatibility with said rubber, and said water flow promoting member is bonded by vulcanization to said main body.

3. A weather strip as set forth in claim 2, wherein said main body is attached to the trunk of an automobile and includes a draining lip held in intimate contact with an automobile body, said lip and said automobile body defining said water passage therebetween, said water flow promoting member having a free edge held in intimate contact with said automobile body.

4. A weather strip as set forth in claim 2, wherein said main body is attached to an automobile door and includes a sealing tube held in intimate contact with an automobile body and a sealing lip held in intimate contact with said door, said sealing tube and said sealing lip defining said water passage therebetween, said water flow promoting member being disposed on said sealing tube and lip.

5. A weather strip as set forth in claim 2, wherein said main body is attached to the roof of an automobile and includes a sealing portion held in intimate contact with a window pane, said water passage being defined between said sealing portion remote from the interior of said automobile and said window pane, said water flow promoting member being disposed on said sealing portion.

6. A weather strip as set forth in claim 2, wherein said main body is attached to a built-in window pane on an automobile and includes a pressing lip held in intimate contact with an automobile body and a groove in which said pane is fitted, said groove and said pane defining said water passage therebetween and said water flow promoting member being disposed in said groove, said main body having another water passage defined between said pressing lip and said automobile body and another water flow promoting member disposed in said other water passage.

7. A weather strip as set forth in claim 1, wherein said hydrophilic material consists mainly of a low molecular polyolefin polyol and contains ethylene oxide.

8. A weather strip as set forth in claim 7, wherein said hydrophilic material further contains a water absorbing polymer.

9. A weather strip as set forth in claim 1, wherein said hydrophilic material comprises EPDM rubber and a hydrophilic agent selected from the group consisting of polyethylene glycol, surface active agents and emulsifiers.

10. A weather strip as set forth in claim 1, wherein said hydrophilic material contains a water absorbing polymer, such as a saponified vinyl acetate-methyl acrylate copolymer.

11. A weather strip as set forth in claim 1, wherein said hydrophilic material is a paint consisting mainly of a low molecular polyolefin polyol and containing ethylene oxide, which are dissolved in a solvent, such as toluene, and applied to said water flow promoting member.

* * * * *